United States Patent

Fentzahn (10) Patent No.: US 9,225,546 B2
(45) Date of Patent: Dec. 29, 2015

(54) METHOD AND DEVICE FOR OPERATING A SLAVE

(71) Applicant: Robert Bosch GmbH, Stuttgart (DE)

(72) Inventor: Thomas Fentzahn, Lohr Am Main (DE)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 13/675,226

(22) Filed: Nov. 13, 2012

(65) Prior Publication Data

US 2013/0124766 A1 May 16, 2013

(30) Foreign Application Priority Data

Nov. 14, 2011 (DE) .......................... 10 2011 118 362

(51) Int. Cl.
*G06F 13/00* (2006.01)
*G06F 3/00* (2006.01)
*G06F 5/00* (2006.01)
*H04L 12/42* (2006.01)

(52) U.S. Cl.
CPC ...................................... *H04L 12/42* (2013.01)

(58) Field of Classification Search
USPC ................................ 710/32, 52, 59, 100, 110
See application file for complete search history.

(56) References Cited

U.S. PATENT DOCUMENTS

| | | | | |
|---|---|---|---|---|
| 4,528,662 A * | 7/1985 | Floyd et al. ................... | 370/216 |
| 4,884,192 A * | 11/1989 | Terada et al. ................... | 709/251 |
| 5,157,662 A * | 10/1992 | Tadamura ........... | H04Q 11/0428 | 370/352 |
| 5,181,202 A * | 1/1993 | Walser et al. .................. | 370/452 |
| 5,377,184 A * | 12/1994 | Beal ....................... | G06F 13/122 | 370/231 |
| 5,886,992 A * | 3/1999 | Raatikainen et al. .......... | 370/410 |
| 6,072,804 A * | 6/2000 | Beyers, Jr. ..................... | 370/450 |
| 6,094,434 A * | 7/2000 | Kotzur .................. | H04L 49/351 | 370/401 |
| 2004/0160451 A1* | 8/2004 | Walls et al. .................... | 345/558 |
| 2004/0177162 A1* | 9/2004 | Wetzel .................... | H04L 29/06 | 709/248 |
| 2005/0002384 A1* | 1/2005 | Larson ................ | G06F 13/4291 | 370/360 |
| 2009/0077401 A1* | 3/2009 | Tsai .............................. | 713/320 |
| 2010/0005365 A1* | 1/2010 | Buchmann ............ | H03M 13/13 | 714/758 |
| 2011/0150055 A1* | 6/2011 | Qu ......................... | G09G 5/006 | 375/220 |
| 2012/0155205 A1* | 6/2012 | Ku ................................ | 365/222 |

OTHER PUBLICATIONS

Defintion of "deactivate", thefreedictionary.com (citing the American Heritage Dictionary of the English Language, Fourth Edition, 2000, Houghton Mifflin Company), retrieved from the Internet on Dec. 4, 2014 at <http://www.thefreedictionary.com/deactivate>.*

* cited by examiner

*Primary Examiner* — Faisal M Zaman
(74) *Attorney, Agent, or Firm* — Maginot, Moore & Beck LLP (57) ABSTRACT

A method for operating a first slave which is connected to a master and to at least one further slave includes sending, with the master, in each case at least one forward telegram in a forward direction and at least one reverse telegram in a reverse direction via the bus line to the first slave and the at least one further slave. The method further includes deactivating a buffer memory of the first slave in order to stop a forwarding of forward telegrams and reverse telegrams up to a reactivation time when the forward telegram and the reverse telegram are received within a predetermined time window. The first slave is in an annularly closed bus line.

10 Claims, 5 Drawing Sheets

METHOD AND DEVICE FOR OPERATING A SLAVE

This application claims priority under 35 U.S.C. §119 to patent application no. DE 10 2011 118 362.4, filed on Nov. 14, 2011 in Germany, the disclosure of which is incorporated herein by reference in its entirety.

BACKGROUND

The present disclosure relates to a method for operating a slave, to a device for operating a slave, and to a corresponding computer program product.

In a conventional bus system, a bus user master controls a number of bus user slaves. The master monitors a structure of the bus and communicates with the slaves. The slaves are dependent on the master and do not perform any action without previous command from the master. When a new slave is added to the bus system, it is necessary that the master detects this and adapts a communication routine of the bus.

SUMMARY

It is the object of the present disclosure to provide an improved method for operating a slave, an improved device for operating a slave and a corresponding computer program product.

This object is achieved by a method for operating a slave, a device for operating a slave and a corresponding computer program product.

In a ring-shaped bus system having a controlling higher-level bus user (master) and at least two hierarchically subordinate bus users (slaves), a "natural oscillation" may arise in the bus communication if a number of subordinate bus users simultaneously begin to communicate in the bus system. For example, the subordinate bus users can be connected simultaneously electrically to the bus or the subordinate bus users can simultaneously perform a restart of a communication routine. The controlling higher-level bus user and the subordinate bus users may then alternately find conditions to be met in order to separate or break up the ring-shaped structure of the bus which in each case can lead to an interruption of the ring communication on the bus.

Resonating of the bus system can be prevented if one of the subordinate bus users interrupts the communication on the bus by at least one time increment longer than other bus users. The bus can be stabilized by the pauses.

Advantageously, a bus system can achieve a stable state within a short period of time if a contact of a slave to a predetermined arm of the bus is used as indicator for waiting for an extended transmission interval so that other slaves can begin a normal communication routine within that time.

A method for operating a first slave in an annularly closed bus line which is connected to a master and to at least one further slave, wherein the master sends in each case at least one forward telegram in a forward direction and at least one reverse telegram in a reverse direction via the bus line to the slaves, has a step of deactivating a buffer memory of the first slave in order to stop a forwarding of forward telegrams and reverse telegrams up to a reactivation time when the forward telegram and the reverse telegram are received within a predetermined time window.

A slave can be understood to be a hierarchically subordinate bus user which is controlled and/or managed by a master as hierarchically higher-level bus user. A bus system can be an arrangement of a number of devices communicating with one another which are connected via a common bus line. Via the bus line, communication is carried out by means of a technical language unified for the bus system. The bus system can be formed to be ring-shaped and the communication can then take place redundantly because messages and signals can be sent out in opposite transport directions in the bus system. The directions can be designated as forward direction and as reverse direction. Similarly, the directions can be designated, for example, as primary and secondary, as left-hand and right-hand or as x and y. The messages and signals can be designated as telegram. A telegram can have a start and an end. The telegram can be closed in itself, for example as a data word of the data transmission on the bus system. The forward telegram and the reverse telegram can be identified to be distinguishable and have identical information content. The slaves can have a buffer memory which is designed for temporarily storing telegrams until they can be forwarded. When the buffer memory is deactivated, a currently proceeding transaction can be ended whilst a transaction next in queue is not begun. As a result, telegrams cannot be cut up.

The reactivation time can be determined by a recurring signal pulse. A signal pulse can be a trigger signal which is received regularly. For example, the signal pulse can be received by an external source which provides the signal pulse for clocking.

The reactivation time can be advanced independently of the recurring signal pulse if a further reverse telegram is received. If a further reverse telegram is received, this means that the at least one further slave has reactivated its buffer memory and continues to forward the reverse telegrams. It is thus detected that the ring is closed and only the first slave is to allow its buffer memory to be continuously deactivated since the condition for deactivation is permanently met only at the first slave.

In response to a reception of a further forward telegram and of a further reverse telegram whilst the buffer memory is deactivated, it is possible to wait for at least two further recurring signal pulses from a time of the reception up to the reactivation time. As long as telegrams are received from both directions, the buffer memory can remain deactivated. If the ring line is interrupted, this condition is redundant and the telegrams can be forwarded.

It is possible to wait for at least two recurring signal pulses between a time of deactivating and the reactivation time. Between two signal pulses, there is a minimum period for the deactivation for which it is necessary to wait in every case until the buffer memory of the first slave can be reactivated again.

In response to a reception of a further forward telegram whilst the buffer memory is deactivated, the reactivation time can be shifted into the future by one pulse of the trigger signal. Since only the first slave receives forward telegrams, shifting the reactivation time gives the other slaves time for setting up normal communication with the master over the reverse direction until the reverse telegrams arrive again also at the first slave.

The reactivation time can be shifted into the future maximally further three times by one trigger pulse each. If the bus line has been interrupted in the reverse direction between the first slave and the master after the buffer memory has been deactivated, the forward telegrams can be forwarded to slaves cut off until then and thus the communication restored again.

The step of deactivating can be executed in response to a starting process of at least the first slave. A starting process can occur due to a preceding separation and subsequent integration into the bus. A starting process can also be a restart of the slave.

A device is also of advantage which is designed for performing or implementing the steps of the method according to the disclosure in corresponding equipment. The object forming the basis of the disclosure can also be achieved rapidly and efficiently by this variant of an embodiment of the disclosure in the form of a device.

In the present context, a device can be understood to be an electrical apparatus which processes sensor signals and in dependence thereon outputs control and/or data signals. The device can have an interface which can be constructed in hardware and/or software. In the case of a hardware design, the interfaces can be, for example, part of a so-called system ASIC which contains the most varied functions of the device. However, it is also possible that the interfaces are independent integrated circuits or at least partially consist of discrete components. In the case of a software design, the interfaces can be software modules which, for example, are present on a microcontroller in addition to other software modules.

A computer program product with program code is also of advantage which can be stored on a machine-readable medium such as a semiconductor memory, a hard-disk memory or an optical memory and is used for performing the method according to one of the embodiments described above when the program is executed on a computer or a device.

BRIEF DESCRIPTION OF THE DRAWINGS

In the text which follows, the disclosure will be explained in greater detail by way of example with reference to the attached drawings, in which.

DETAILED DESCRIPTION

Identical or similar elements can be provided by identical or similar reference designations in the subsequent figures. Furthermore, the figures of the drawings, their description and the claims contain numerous features in combination. In this context, it is clear to an expert that these features can also be considered individually or can be combined to form further combinations not described explicitly here.

Figure 1:
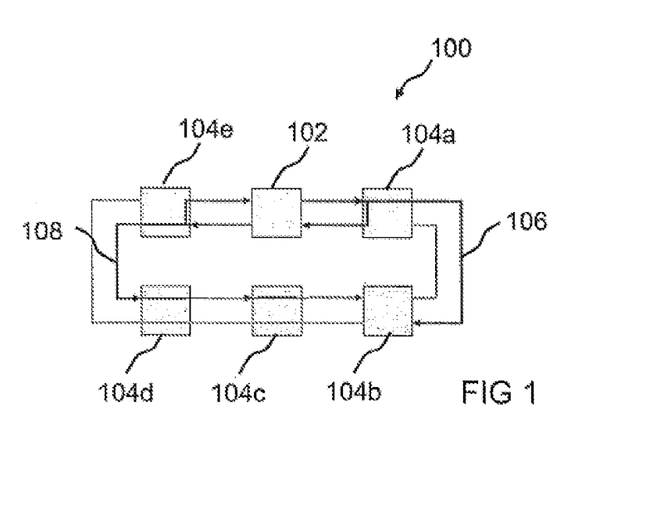
FIG. 1 shows a representation of an annularly closed bus system after the sequence of a method according to an illustrative embodiment of the present disclosure.

FIG. 1 shows a representation of an annularly closed bus system 100 after the sequence of a method according to an illustrative embodiment of the present disclosure. The bus system 100 has a master 102 and five slaves 104a to 104e which are connected annularly end to end via a bus line. The master 102 sends forward telegrams via a forward port in one ring direction via a forward channel 106. At the same time, the master 102 sends reverse telegrams via a reverse port in an opposite ring direction via a reverse channel 108. One forward telegram each corresponds to one reverse telegram. Both have the same information content. The forward telegram is identified as forward telegram. The reverse telegram is identified as reverse telegram. The slaves 104b, 104c and 104d have been connected to the bus 100 at the same time and complete the bus 100 to form a closed ring. In the ring, the forward line 106 and the reverse line 108 are also closed annularly. For this reason, wrongly addressed telegrams can circulate endlessly in the bus system and disturb the communication. To prevent endlessly circulating telegrams, the forward line 106 and the reverse line 108 are to be separated at a single point. The prerequisite for this should be that the forward telegram and the reverse telegram arrive at the slave 104. This prerequisite is met by the slaves 104b, 104c and 104d. For this reason, they all deactivate the collision buffer and thus prevent the telegrams from being forwarded. Over a short time, the slave 104c can thus be the reached neither by forward telegrams nor by reverse telegrams. According to the approach presented here, the collision buffer of the slave 104b is therefore left deactivated by at least one time increment longer than the collision buffers of the slaves 104c and 104d. For this purpose, it has been predetermined for this illustrative embodiment that receiving the forward telegrams causes an extension of the deactivating. Since the slaves 104c and 104d cannot receive any forward telegrams because the slave 104b does not forward the telegrams, the reverse telegrams are forwarded by the reverse line 108 up to the slave 104b after the slaves 104d and 104c have reactivated the buffer memory and the original condition for deactivating the buffer memory in the slave 104b is again permanently given. The bus system 100 is thus in a stable state.

Figure 2:
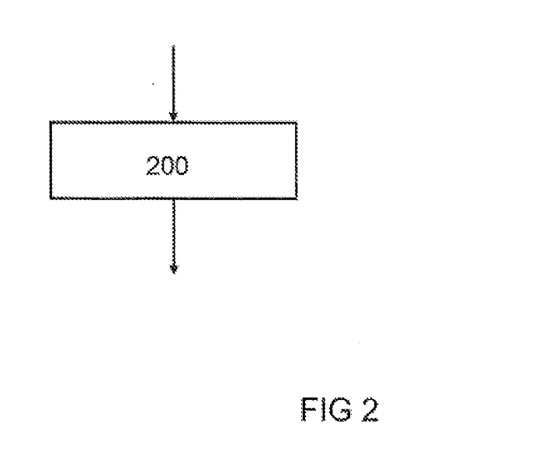
FIG. 2 shows a flowchart of a method for operating a slave according to an illustrative embodiment of the present disclosure.

FIG. 2 shows a flowchart of a method for operating a first slave in an annularly closed bus line according to an illustrative embodiment of the present disclosure. The method can be executed in a bus system as is shown in FIG. 1. The bus line is connected to a master and to at least one further slave. The master sends in each case at least one forward telegram in a forward direction and at least one reverse telegram in a reverse direction via the bus line to the slaves. The method has a step of deactivating 200 a buffer memory of the first slave in order to stop a forwarding of forward telegrams and reverse telegrams up to a reactivation time when the forward telegram and the reverse telegram are received within a predetermined time window.

Figure 3:
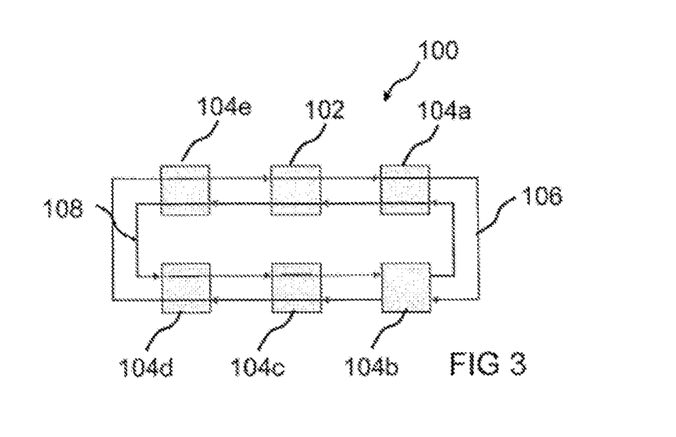
FIG. 3 shows a representation of the annularly closed bus system from FIG. 1 in a further communication phase.

FIG. 3 shows the bus system 100 from FIG. 1 in a further communication phase. After the sequence of an illustrative embodiment of a method according to the approach presented here, the slave 104b still has its buffer memory deactivated as shown in FIG. 1. The slave 104b thus divides the ring of the bus system 100 so that no telegrams can circulate around the ring. In this communication phase, the telegrams are data packets of an external network which are distributed to the slaves 104a to 104e and to the master 102 via the forward line 106 and the reverse line 108. For example, the data can be Ethernet messages. In this context, messages which are addressed to one of the other bus users are forwarded via the buffer memories. The slave 104b suppresses the forwarding of the data packets and thus stabilizes the bus system.

Figure 4:
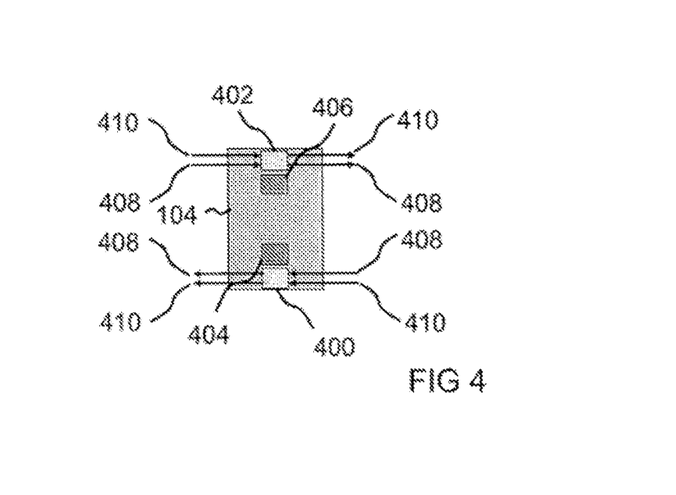
FIG. 4 shows a representation of a slave with activated buffer memory.

FIG. 4 diagrammatically shows a representation of a bus user for the example of a slave 104. The slave 104 can represent one of the slaves 104 from FIG. 1. The slave 104 has a first collision buffer "CB" 400, a second collision buffer "CB" 402, a first real-time buffer "RT" 404 and a second real-time buffer "RT" 406. The first and the second collision buffer 400, 402 are designed as buffer memories for storing incoming telegrams at an input "RX" and forwarding them via an output "TX" when the conditions for forwarding are met. If a telegram is addressed to the slave 104, the telegram is not forwarded. If a subsequent line section is still occupied by a preceding telegram, the telegram is not forwarded. The first collision buffer 400 is connected on one side "Py" to the forward line. In the communication phase shown here, "non-real-time mode", "NRT mode" or "NRT state/HP0" telegrams of the data bus "Sercos" 408 and data packets of an external network "IT" 410 are written into the first collision buffer 400 via the forward line. The messages 408 and data packets 410 to be forwarded from there are subsequently forwarded to an opposite side "Px" via the forward line. The first real-time buffer 404 is inactive in this communication phase. Via the reverse line, telegrams 408 and data packets 410 on the "Px" side are similarly written into the second collision buffer 402 and also sent on again on the "Py" side. The second real-time buffer 406 is also inactive.

Figure 5:
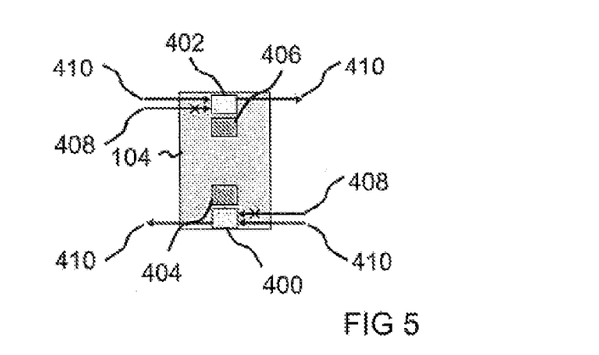
FIG. 5 shows a representation of a slave with partially deactivated buffer memory.

FIG. 5 shows the slave 104 from FIG. 4 in another communication phase of the "NRT mode" in the "NRT channel". The communication phase shown essentially corresponds to the representation in FIG. 4. In this illustrative embodiment, however, the telegrams 408 are not written into the collision buffers 400, 402. Thus, they are also not forwarded. This does not affect the data packets 410.

Figure 6:
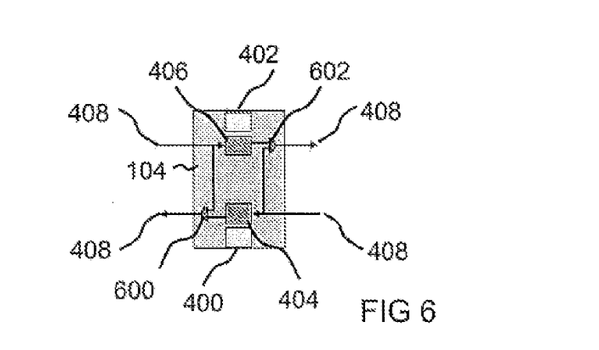
FIG. 6 shows a representation of a slave in a further communication mode.

FIG. 6 shows the slave 104 from FIGS. 4 and 5 in another communication phase in the "RT channel" or, respectively, "CP0-CP4, HP1-HP2". In this communication phase, no data packets are received or sent out. There are no data packets available. The telegrams 408 will now be written into the real-time buffers 404, 406 and also forwarded. The collision buffers 400, 402 are inactive. Additionally, the forward line is connected to the reverse line and the telegrams can be sent out in the opposite direction. For this purpose, signal diplexers "LB Px" 600 and "LB Py" 602, which connect the signal paths, are arranged at the "TX" outputs.

Figure 7:
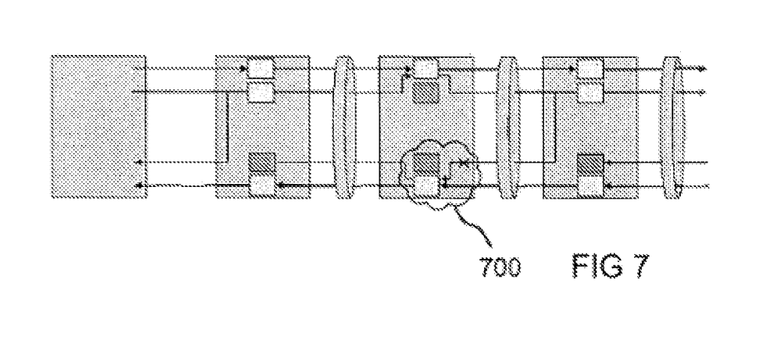
FIG. 7 shows a representation of one arm of a bus system with a master and a number of slaves.

FIG. 7 shows an approach as to how it can be prevented, with hot plugging of a number of Sercos III slaves, that between the last slave in the line and the HP1/HP2 slave, which has already activated loopback, a slave is located in the NRT state or HP0 which either does not support hot plugging or has missed a hot plug parameter due to delays. This slave currently forwards all Ethernet telegrams including Sercos III, whereupon the last slave in the line reports a Sercos III link at its inactive port to the master. The master will abort the transmitting of the HP0 parameters by means of the specification and switch over the last slave in the line from loopback to fast forward which can considerably disturb the communication in this case due to the "Cut-Through" or "Store and Forward" mechanism of the slave in the NRT state or HP0.

Since the master and also the last slave in the line do not have any general capability of diagnosing this topology, the slave in the NRT state or HP0 should not conduct the Sercos III telegrams back to the last slave in the line. The last slave in the line then reports a Sercos III link at its inactive port for a short time at the most, whereupon the master, with suitable filtering, does not switch it to fast forward either.

In this context, the slave in the NRT state or HP0 should monitor the reception of Sercos III P or S telegrams of the CP1-CP4 communication phase at both ports and, if necessary analogously to deactivating the collision buffer, start a timeout 700 in which no further Sercos III telegrams are forwarded on the return path. This timeout 700 lasts between 67 and 134 ms and only affects the Sercos III telegrams. The timeout 700 is ended if the condition for discarding the telegrams has been unambiguously canceled (e.g. slave changes from HP0 to HP1 or MST phase changes to CP0). The important factor in the method is that the Sercos III telegrams are filtered in dependence on direction, namely only on the return path. Otherwise, the condition for the slave is already extinguished due to the filtering in both directions and the HP1 and HP2 slaves may unnecessarily drop back into the NRT state.

Figure 8:
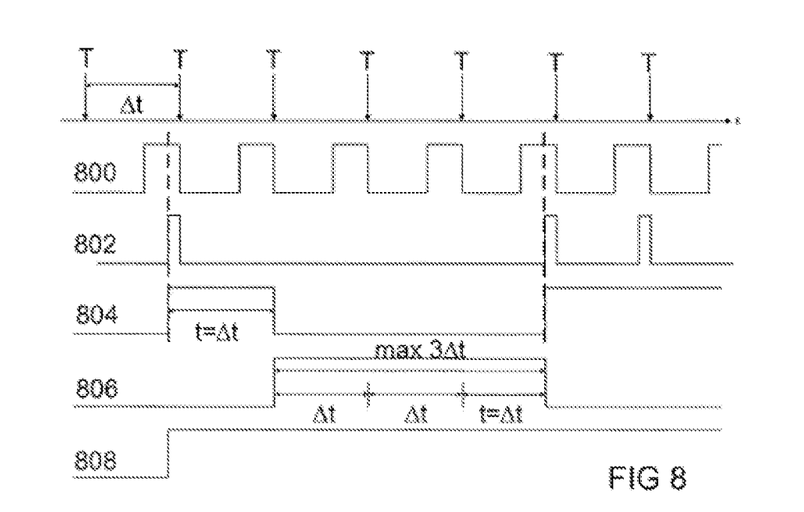
FIG. 8 shows a representation of states and sequences in a first slave according to an illustrative embodiment of the present disclosure.
Figure 9:
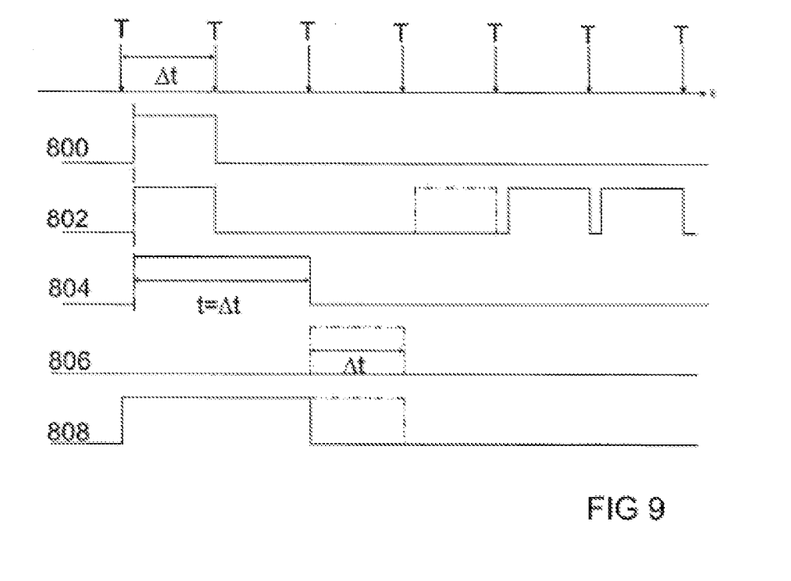
FIG. 9 shows a representation of states and sequences in a second slave according to an illustrative embodiment of the present disclosure.
Figure 10:
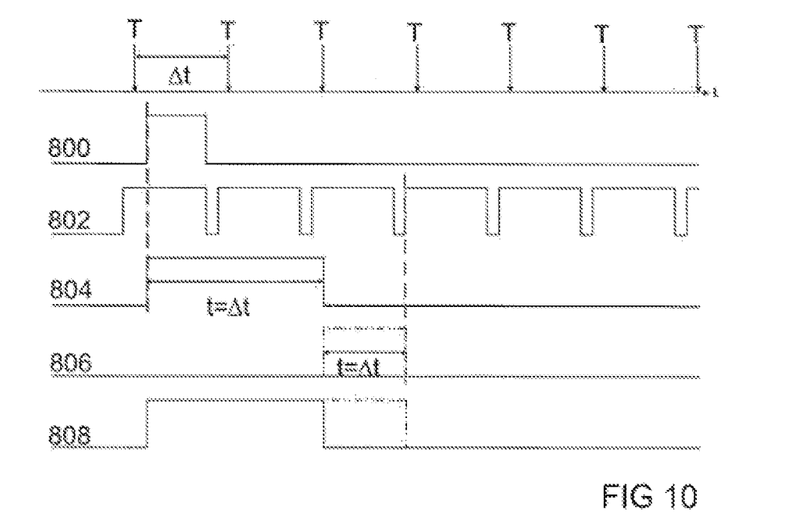
FIG. 10 shows a representation of states and sequences in a further slave according to an illustrative embodiment of the present disclosure.

FIGS. 8 to 10 show state changes of several signals and functions of one each of the slaves 104b, 104c and 104d as shown in FIG. 1 and FIG. 2, in a variation with time. The changes occur in each case in accordance with a method for operating a slave according to an illustrative embodiment of the present disclosure. In this context, FIG. 8 shows processes at the slave 104b, FIG. 9 shows the processes at the slave 104c at the same time and FIG. 10 shows the processes at the slave 104d, also at the same time. A time axis t, on which a trigger signal T is plotted, is in each case plotted above the state changes shown graphically. Two pulses of the trigger T each are separated by a time $\Delta t$ of 67.108864 ms. A state of receiving a forward telegram 800 (Sercos III S telegram) and a state of receiving a reverse telegram 802 (Sercos III P telegram) are plotted below the time axis. Below the states 800 and 802, a "timeout" function 804, an "extension of the timeout" 806 function and a state of the collision buffer 808 are plotted.

FIG. 8 shows the state changes of the signals and functions of the slave 104b in FIG. 1 and FIG. 2. Firstly, a reception of a forward telegram 800 is shown. A reception of a reverse telegram 802 is shown with a slight time offset. At the time at which the reverse telegram 802 is received, the timeout 804 is activated. The timeout 804 remains activated in every case until two successive pulses of the trigger signal T have been received. The timeout 804 can therefore have a duration $t=\Delta t$ which corresponds to a length of between 67.108864 ms and 134.217728 ms. The timeout 804 deactivates the collision buffer 808. During the timeout 804, a further forward telegram 800 is received since the slave 104b in FIG. 1 is arranged at the edge of the group of three and is still in direct contact with the master. In response to the reception of the further forward telegram 800, the timeout is extended by a duration $\Delta t$ up to the next trigger pulse T via the extension 806. The collision buffer 808 remains deactivated. Since no further reverse telegram 802 has yet been received whilst several forward telegrams 800 are received, the extension 806 is extended another two times. Three successive extensions 806 having a duration of maximally 201.236592 ms are specified here as a maximum number. During the third extension 806, a reverse telegram 802 is received whilst a forward telegram 800 is also received. This dispenses with the condition for the extension 806 and the extension 806 is aborted before the next pulse of the trigger signal T is received. At the same time, the reception of the forward telegram 800 and of the reverse telegram 802 is the condition for another timeout 804 and lasting a deactivation of the collision buffer 808. The collision buffer of the slave 104b therefore remains deactivated. The bus is thus in a stable state.

In FIG. 8, it is assumed that the slave is not also connected directly to the P line of the master. Otherwise, Sercos III P telegrams would still be received. Due to the reception of Sercos III S telegrams, a Sercos III P telegram is received again in the third extension, at the latest, whereupon the timeout is started again and the collision buffer remains deactivated.

In FIG. 9, the state changes of the signals and functions of the slave 104c in FIG. 1 and FIG. 2 are shown. The forward telegram 800 and the reverse telegram 802 are received at the same time since the slave 104c is arranged in the half of the bus opposite the master in the annular structure of the bus, and the forward telegram and the reverse telegram are sent out at the same time by the master. The timeout 804 is started and the collision buffer 808 deactivated by the simultaneous reception. Since no further forward telegram 800 is received, the condition for extending the timeout 806 is not given. After receiving the second trigger pulse T, the collision buffer 808 is reactivated. After a certain time, reverse telegrams 802 are received again by the slave 104d which are also forwarded to the slave 104b.

FIG. 10 shows the state changes of the signals and functions of the slave 104d in FIG. 1 and FIG. 2. Since the reverse line is shorter than the forward line in the slave 104d, the slave 104d first receives a reverse telegram 802 before it receives the corresponding forward telegram 800. At the time at which the forward signal 800 is received, the timeout 804 is triggered and the collision buffer 808 deactivated. The timeout 804 remains in existence at least for two trigger pulses T. Since here, too, no further forward telegrams 800 are received, there is no extension of the timeout 806. Since the collision buffer 808 is thus activated again after the timeout 804, the next reverse telegram 802 is forwarded again to the slave 104c delayed by a maximum period t=Δt.

In FIG. 10, it is assumed that the slave is not also connected directly to the S line of the master. Otherwise, Sercos III S telegrams would still be received.

In FIGS. 9 and 10, a possible scatter band is taken into consideration in the activation. Under unfavorable circumstances, there can be a single extension of the timeout 806. The establishment of the stable states in the bus system can then be delayed by one forward/reverse telegram. After 335 ms, at the latest, the topology has stabilized to the telegram flow shown in FIG. 1 and FIG. 2.

In other words, FIGS. 8 to 10 show a collision buffer management with Sercos III slaves. Due to the field problems which have occurred in the analysis of causes, the ruggedness of the Sercos III communication mechanisms is improved by means of the approach presented here. The method proposed in the "User Guide" for the "NRT channel" is extended. Due to the lacking time information in the "NRT channel", oscillations can occur if several slaves deactivate their collision buffer in operation since, by doing so, they deprive each other of the condition of still leaving the collision buffer deactivated. Stable IP communication with all users is thus not possible. The approach presented here determines a single slave which leaves the collision buffer deactivated.

In the case of the hot plug mechanism of a number of slaves at the same time, this ensures that other slaves which may not support hot plugging are not linked into an active Sercos III line and can thus not disturb its synchronization mechanisms. The Sercos III telegrams running back can also be blocked by a slave. Since the approach presented here is linked directly into Sercos III sequences, there are no compatibility problems. After a relatively short time a stable state is reached, the problems thus being eliminated in IP connections.

In forwarding Ethernet telegrams in a Sercos III network, may occur due to the ring topology frequently used in Sercos III and the resultant redundancy, endlessly circulating broadcasts or multicasts or Ethernet telegrams, the destination MAC address of which does not fit to any existing device. As a solution, precisely one Sercos III device can switch off the forwarding of IP telegrams. If this is done by several devices, not all of them can be reached any longer via IP.

With a collision buffer in the NRT state or HP0 and with a deactivated collision buffer, neither Sercos III telegrams nor other Ethernet telegrams are forwarded from Port 1 to Port 2 or conversely. If the collision buffer is activated, both Sercos III telegrams and all other Ethernet telegrams having a broadcast or multicast MAC address and all Ethernet telegrams which are not addressed to the slave will be forwarded.

If the collision buffer is in CP0 to CP4 or HP1 and HP2, respectively, and is deactivated, neither Sercos III telegrams nor other Ethernet telegrams in the "NRT channel" (or "IP channel") are forwarded from Port 1 to Port 2 and conversely. If the collision buffer is activated, no Sercos III telegrams but all other Ethernet telegrams having a broadcast or multicast MAC address and all Ethernet telegrams which are not addressed to the slave will be forwarded in the "NRT channel" (or "IP channel").

Since, in the NRT state, the settings of the Sercos IP core otherwise required for the operation of a Sercos communication are not active, an asynchronous signal is utilized for monitoring Sercos III telegrams, which signal can be obtained from the counter programmed for driving the activity LEDs. This signal generates one trigger pulse every 67,108,864 ns (67 ns). The spacing of the trigger pulses should be greater than the slowest Sercos III cycle time (65 ms). In the text which follows, the spacing of the trigger pulses is specified rounded to 67 ms.

In Sercos III phases CP1-CP4, a timeout of two trigger pulses is started on reception of a Sercos III P telegram at Port x and a Sercos III S telegram at Port y in the slave in the NRT state or HP0, respectively. Due to the asynchronicity of the trigger, this is between 67 ms and 134 ms and long. The collision buffer is deactivated as quickly as possible so that, nevertheless, no telegram currently passing through is destroyed. If the condition mentioned initially occurs again, the timeout is also restarted and the collision buffer remains inactive.

If a Sercos III S telegram is received during this timeout, the collision buffer remains deactivated for a further 67 ms in addition to this timeout phase. If another S telegram is received during this extension, a further extension of 67 ms is carried out. Overall, however, there should be maximally three extensions (201 ms). If a Sercos III P telegram is received during the extensions, the extension is aborted so that the reactivation is accelerated.

Due to this mechanism, the slave connected directly to the S line extends the time by maximally 201 ms and thus deactivates the collision buffer for a total duration of 268 ms to 335 ms if no further P telegram is received, since otherwise the timeout is started again.

At a maximum, all other slaves in the NRT state or HP0 carry out an extension which could result from the asynchronicity and various delays in the deactivation. For these slaves, a total period of 67 ms to 201 ms is therefore obtained and thus at least 67 ms shorter than the slave connected directly to the S line.

Within these 67 ms, all other slaves have reactivated their collision buffers again and the P telegrams are forwarded to the slave connected directly to the S line so that this slave again finds the condition for deactivation of the collision buffer, restarts the timeout and remains as the only slave having a deactivated collision buffer. As a rule, the timeout should start again already during the first to second extension.

If the timeout plus the extension expires or the condition for deactivation of the collision buffer is unambiguously extinguished (e.g. slave changes from HP0 to HP1 or MST phase changes to CP0), the collision buffer is reactivated. However, the reactivation occurs in such a manner that no telegram fragments are generated.

In the case of a logicware-compatible firmware implementation, a timer is programmed for implementing this mechanism which generates an interrupt every 67 ms. In the interrupt routine, the condition for deactivating the collision buffer is checked. If the condition is met, the collision buffer will be deactivated up to the next interrupt (timeout of 67 ms). If the condition is still met at the next interrupt, the timeout is started again. Otherwise, it is checked whether a Sercos III S telegram has been received during this timeout and, if necessary, an extension of the deactivation of the collision buffer of 67 ms is performed. If during the extension, an S telegram is again received, another extension of 67 ms is appended. At a maximum, however, three extensions are permitted.

For diagnostic purposes, the activity LEDs of the two Ethernet ports simultaneously flash at ~2 Hz with a slave in the NRT state or HP0 with activated collision buffer. If, in contrast, the slave has deactivated the collision buffer, the activity LED of the port at which Sercos III S telegrams are received flashes offset in phase by 180°.

Due to the automatic deactivation of the collision buffer in the slave, no further Sercos III telegrams are forwarded apart from the initial Sercos III telegrams which meet the condition for deactivation of the collision buffer. The respective last slaves in the P and the S line thus also report a Sercos III link at their inactive port for a short time at the most. With a suitable waiting time, there is thus no further condition for the master for erroneously remedying the ring with slaves in the NRT mode or HP0, respectively.

Since, in the illustrative embodiment shown here, the slave connected directly to the S line deactivates the collision buffer, the master reaches all slaves in the NRT state or HP0 by means of IP or hot plugging via the P line which can result in a simplification in the implementation. On the other hand, only the slave connected directly to the S line can be reached via the S line.

In the case of several Sercos III slaves being hot plugged, it may occur that, between the last slave in the line and the HP1/HP2 slave which has already activated loopback, a slave is located in the NRT state or HP0 which either does not support hot plugging or has missed a hot plug parameter due to delays. This slave currently forwards all Ethernet telegrams including Sercos III, whereupon the last slave in the line reports a Sercos III link at its inactive port to the master. Referring to the specification, the master will abort the transmitting of the HP0 parameters and switch over the last slave in the line from loopback to fast forward which in this case can considerably disturb the communication due to the "Cut-Through" or "Store and Forward" mechanism of the slave in the NRT state or HP0.

Since the master and the last slave in the line, too, do not have any general capability of diagnosing this topology, the slave in the NRT state or HP0 should not conduct the Sercos III telegrams back to the last slave in the line. The last slave in the line then reports a Sercos III link at its inactive port for a short time at the most, whereupon the master, with suitable filtering, does not switch it to fast forward, either.

In this context, the slave in the NRT state or HP0 should monitor the reception of Sercos III P or S telegrams of the communication phase CP1-CP4 at both ports and, if necessary, analogously to deactivating the collision buffer, start a timeout in which no further Sercos III telegrams are forwarded on the return path. This timeout lasts between 67 and 134 ms and only affects the Sercos III telegrams. The timeout is ended if the condition for discarding the telegrams is unambiguously canceled (e.g. slave changes from HP0 to HP1 or MST phase changes to CP0). The important factor in the method is that the Sercos III telegrams are filtered in dependence on direction, namely only on the return path. Otherwise, the condition for the slave is already extinguished due to the filtering in both directions and the HP1 or HP2 slaves may unnecessarily drop back into the NRT state.

The illustrative embodiments shown have only been selected as examples and can be combined with one another.

LIST OF REFERENCE DESIGNATIONS

100 Bus system
102 Master
104a-e Slave(s)
106 Forward line
108 Reverse line
200 Step of deactivating
400 Collision buffer
402 Collision buffer
404 Real-time buffer
406 Real-time buffer
408 Telegram
410 Data packet
600 Diplexer
700 Timeout
800 Forward telegram
802 Reverse telegram
804 Timeout
806 Extension
808 Deactivation
T Trigger pulse
t Time
Δt Duration

What is claimed is:

1. A method for operating a first slave which is connected to a master and to at least one further slave, comprising:
   sending, with the master, in each case at least one forward telegram in a forward direction and at least one reverse telegram in a reverse direction via the bus line to the first slave and the at least one further slave; and
   deactivating a buffer memory of the first slave in order to stop a forwarding of forward telegrams and reverse telegrams up to a reactivation time when the forward telegram and the reverse telegram are received within a predetermined time window,
   wherein the first slave is in an annularly closed bus line.

2. The method according to claim 1, further comprising:
   determining the reactivation time by a recurring signal pulse.

3. The method according to claim 2, further comprising:
   advancing the reactivation time independently of the recurring signal pulse if a further reverse telegram is received.

4. The method according to claim 1, further comprising:
   waiting for at least two further recurring signal pulses from a reception time up to the reactivation time, in response to a reception of a further forward telegram and of a further reverse telegram whilst the buffer memory is deactivated.

5. The method according to claim 1, further comprising:
   waiting for at least two recurring signal pulses between a time of deactivating and the reactivation time.

6. The method according to claim 1, further comprising:
   shifting the reactivation time into the future by one pulse of a recurring signal pulse, in response to a reception of a further forward telegram whilst the buffer memory is deactivated.

7. The method according to claim 6, wherein the reactivation time is shifted into the future maximally three times by one pulse of the recurring signal pulse each.

8. The method according to claim 1, wherein the deactivating is executed in response to a starting process of at least the first slave.

9. A device for operating a first slave which is connected to a master and to at least one further slave, comprising:
- a first unit configured to send, with the master, in each case at least one forward telegram in a forward direction and at least one reverse telegram in a reverse direction via the bus line to the first slave and the at least one further slave; and
- a second unit configured to deactivate a buffer memory of the first slave in order to stop a forwarding of forward telegrams and reverse telegrams up to a reactivation time when the forward telegram and the reverse telegram are received within a predetermined time window, wherein the first slave is in an annularly closed bus line.

10. A non-transitory computer program storage product, comprising:
- a program code configured to perform a method when the program is executed on a device, wherein the method is configured to operate a first slave in an annularly closed bus line which is connected to a master and to at least one further slave, and wherein the method includes
- sending, with the master, in each case at least one forward telegram in a forward direction and at least one reverse telegram in a reverse direction via the bus line to the first slave and the at least one further slave, and deactivating a buffer memory of the first slave in order to stop a forwarding of forward telegrams and reverse telegrams up to a reactivation time when the forward telegram and the reverse telegram are received within a predetermined time window.

* * * * *